(12) United States Patent
Bratzdrum

(10) Patent No.: US 7,349,442 B2
(45) Date of Patent: Mar. 25, 2008

(54) METHOD FOR SERIAL TRANSMISSION BETWEEN A POSITION MEASURING DEVICE AND A PROCESSING UNIT

(75) Inventor: Erwin Bratzdrum, Hallabruck (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 977 days.

(21) Appl. No.: 10/454,792

(22) Filed: Jun. 4, 2003

(65) Prior Publication Data

US 2004/0022274 A1 Feb. 5, 2004

(30) Foreign Application Priority Data

Jun. 4, 2002 (DE) ............... 102 24 627

(51) Int. Cl.
*H04J 3/06* (2006.01)
(52) U.S. Cl. .................................... 370/508
(58) Field of Classification Search ................. 370/508
See application file for complete search history.

(56) References Cited

U.S. PATENT DOCUMENTS

| | | | |
|---|---|---|---|
| 5,248,921 A | | 9/1993 | Kato et al. |
| 5,625,353 A | * | 4/1997 | Katagiri et al. ........ 340/870.03 |
| 5,689,161 A | | 11/1997 | Fugere et al. |
| 7,043,398 B2 | * | 5/2006 | Hofbauer et al. ........... 702/182 |
| 2002/0015389 A1 | | 2/2002 | Wastlhuber et al. |
| 2002/0015449 A1 | | 2/2002 | Wastlhuber et al. |
| 2002/0045956 A1 | | 4/2002 | Kapitan |
| 2004/0153570 A1 | * | 8/2004 | Shobatake .................. 709/238 |

FOREIGN PATENT DOCUMENTS

| | | |
|---|---|---|
| DE | 100 30 357 A1 | 1/2002 |
| DE | 100 30 358 A1 | 1/2002 |
| EP | 0 534 690 A2 | 3/1993 |

OTHER PUBLICATIONS

Kiel, Edwin et al., "Einchip-Controller fur das SERCOS-Interface—Integrierte Echtzeit-Kommunikation fur die MSR-Technik," Elektronik, vol. 41, No. 6, Mar. 17, 1992, pp. 50 and 55-59.

Song, Y.Q. et al., "Adding Local Scheduling Mechanism to FDDI for Time Critical Communications," Industrial Electronics, Control and Instrumentation, 20th International Conference held in Bologna, Italy 1994, published by IEEE, vol. 2, Sep. 5, 1994, pp. 1190-1195.

* cited by examiner

*Primary Examiner*—Seema S. Rao
*Assistant Examiner*—Sai-Ming Chan
(74) *Attorney, Agent, or Firm*—Brinks Hofer Gilson & Lione

(57) ABSTRACT

A system that includes a position measuring device, a processing unit, a first data channel connecting the position measuring device to the processing unit and for transmitting data from the position measuring device to the processing unit and a second data channel connecting the position measuring device to the processing unit and for transmitting data from the processing unit to the position measuring device. Serial data transmission between the position measuring device and the processing unit is based on ethernet physics, wherein it is assured that a pickup of position data in the position measuring device always takes place at defined times and with the least possible chronological inexactness.

11 Claims, 5 Drawing Sheets

METHOD FOR SERIAL TRANSMISSION BETWEEN A POSITION MEASURING DEVICE AND A PROCESSING UNIT

Applicant claims, under 35 U.S.C. § 119, the benefit of priority of the filing date of Jun. 4, 2002 of a German patent application, copy attached, Serial Number 102 24 627.0, filed on the aforementioned date, the entire contents of which is incorporated herein by reference.

BACKGROUND OF THE INVENTION

1. Field of the Invention

The present invention relates to a method for serial data transmission between a position measuring device and a processing unit.

2. Discussion of Related Art

A method, as well as a device for the serial data transmission between a position measuring device and a processing unit is known from DE 100 30 358 A1 of Applicant, which for example allows a highly dynamic regulation of drive mechanisms on the basis of position data generated by the position measuring device. This printed document essentially discloses a suitable protocol structure of a correspondingly laid-out digital interface, by which a rapid, interruptible point-to-point connection between the processing unit and the position measuring device is made possible. Regarding the actual physical layout of such an interface it is merely stated that the proposed protocol structure for the serial data transmission can be performed on the basis of the most varied known interface concepts. But the printed document does not provide details regarding the concrete embodiment of the actual physical structure of the interface.

The same applies to DE 100 30 357 A1 of Applicant, wherein essentially the solution of a problem resulting from the use of the protocol structure from the mentioned DE 100 30 358 A1 is proposed, namely the elimination of a possibly existing chronological uncertainty in regard to position request commands, or recording pulses, which result from the capability of the interface to be interrupted. Such an uncertainty would be particularly disadvantageous in regard to the real time capabilities of the interface, from which result great demands on the position measuring device with respect to the creation, or recording, of position data, which are time-determined as much as possible.

If the principle for serial data transmission known from DE 100 30 358 A1 is to be used in connection with so-called ethernet physics, further problems result because of the required real time capability of the interface. As already mentioned, in the case of a highly dynamic regulation it must be primarily assured that as deterministic as possible a pickup, or recording, of position data by the position measuring device takes place, independent of the time at which a corresponding position request command from the processing unit appears. Possible chronological uncertainties regarding the time of pickup or recording of the position data have a disadvantageous effect on the resultant quality of the regulation. When employing ethernet physics and the basic capability of the interface to be interrupted, real time capability cannot be assured without further measures.

OBJECT AND SUMMARY OF THE INVENTION

It is therefore an object of the present invention to disclose a method for serial data transmission between a position measuring device and a processing unit, which is capable of being interrupted, wherein it is assured, particularly in case ethernet physics are employed, that the pickup of position data in the position measuring device always takes place at defined times and with the least possible chronological inexactness.

This object is attained by a method for serial data transmission between a position measuring device and a processing unit. The method includes transmitting data packets between a position measuring device and a processing unit during a set of use phases, wherein a set of idle phases during which no data are transmitted are interspersed so that an idle phase is located between successive ones of the set of use phases. In case of an appearance of a position request command during one of the set of idle phases, the position request command is transmitted, together with a first delay information, to the position measuring device at an end of the one of the set of idle phases. Evaluating the first delay information by the position measuring device to the effect that a constant delay time always results between an appearance of the position request command at the processing unit and processing of the position request command at a processing unit of the position measuring device.

This object is also attained by a system that includes a position measuring device, a processing unit, a first data channel connecting the position measuring device to the processing unit and for transmitting data from the position measuring device to the processing unit and a second data channel connecting the position measuring device to the processing unit and for transmitting data from the processing unit to the position measuring device. Serial data transmission between the position measuring device and the processing unit is based on ethernet physics, wherein it is assured that a pickup of position data in the position measuring device always takes place at defined times and with the least possible chronological inexactness.

In accordance with the present invention it is now provided that, when a position request command occurs during an idle phase, in which no data are transmitted by the processing device to the position measuring device, the position request command is transmitted to the position measuring device, together with a first delay information, at the end of the idle phase. The first delay information can be evaluated by the position measuring device in such a way that a constant delay time always results between the appearance of the position request command at the processing unit and the processing of the position request command in the position measuring device.

In particular in case of the use of ethernet physics with defined predetermined data transmission modalities, the steps in accordance with the present invention assure a pickup, or recording of time-determined position data by the position measuring device, i.e. the demands made on the real time capability of such an interface concept can be met. The time-determined pickup of position data is assured here in all possible cases wherein an asynchronous position request command from the processing unit can occur. Thus, the method of the present invention is capable of being interrupted and is therefore independent of a preset fixed clock grid in which position request commands result. In connection with every asynchronously appearing position request command it is possible in principle to assure a time-determined pickup of position data by the position measuring device. Therefore the steps in accordance with the present invention can be employed particularly advantageously in connection with a method such as is known from DE 100 30 358 A1 already mentioned above.

Moreover, the steps of the present invention can be employed particularly usefully for performing a determination of signal running times between a position measuring device and a processing unit within the scope of such a data transmission.

Further advantages, as well as details of the present invention ensue from the following description of an exemplary embodiment by the attached drawings.

DETAILED DESCRIPTION OF THE PREFERRED EMBODIMENTS

Figure 1:
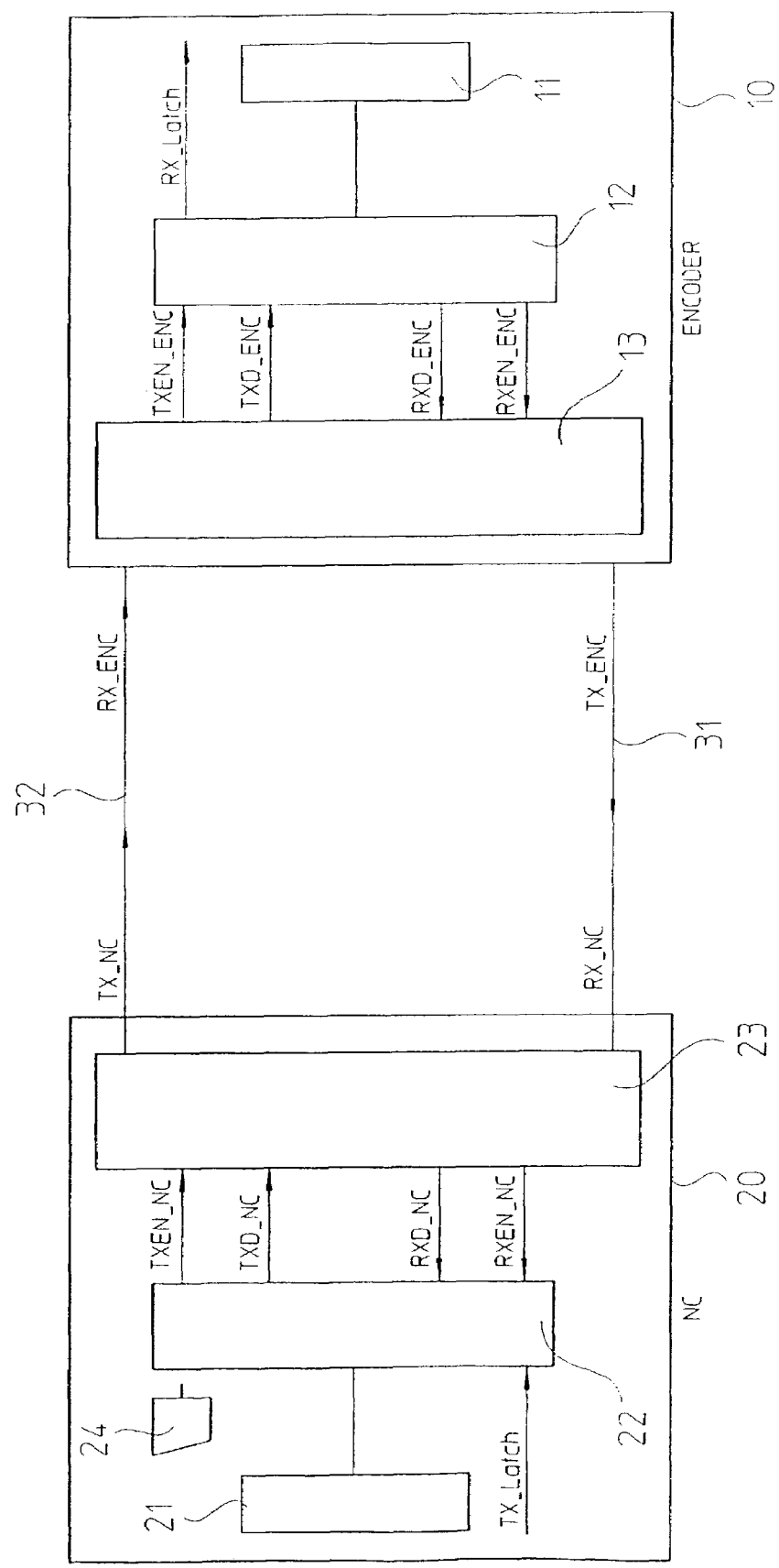
FIG. 1 is a schematized block circuit diagram of an embodiment of a system with a position measuring device, signal transmission path and processing unit in accordance with the present invention.

A greatly schematized block circuit diagram of a system including a position measuring device (ENCODER) 10, signal transmission path and processing unit (NC) 20 is represented in FIG. 1. The serial data transmission between the position measuring device 10 and the processing unit 20 is performed in a full duplex operation via the two data channels 31, 32, each of which can include one or several lines. Position data, as well as possibly further data, are generated by the position measuring device 10 in a position data generating unit 11, not further explained, or in other ways, and are processed by a protocol module 12 and a communications module 13 for the serial transmission in the form of a continuous data flow to the processing unit 10 via the first data channel 31. The protocol module 12 and the communications module 13 are connected with each other via an appropriate interface and a number of lines, which will be explained in detail in the course of the subsequent description. Preferably a so-called fast ethernet physical layer module (ethernet PHY) is used as the communications module 13, through which the serial data transmission is performed in a known manner within the scope of existing ethernet physics.

A basically identical interface architecture is provided for the processing unit 20, i.e. the transmitted data are provided to a position data processing unit 21 via a further communications module 23 and a protocol module 22, which further processes the data in a suitable manner. A data transmission via the same modules and the second data channel 32 from the processing unit 20 in the direction toward the position measuring device is possible analogously to this. These can be, for example, command data, parameterization data, etc., which are transmitted to the position measuring device.

It should furthermore be mentioned that a unit 24 is assigned to the protocol module 22 of the processing unit 20, which will be called automatic status device 24 in what follows and which provides defined information independently of the just transmitted data. Its exact function in connection with the present invention will be explained in detail in the course of the subsequent description.

It should be pointed out here that FIG. 1 is merely a greatly schematized representation of the total architecture, and only the components required for explaining the present invention are indicated. The various lines connecting the individual components with each other will be explained in greater detail in the course of the subsequent description of FIGS. 2 to 4. The position measuring device 10 and the processing unit 20 naturally include further functionally relevant components which, however, are not represented in FIG. 1 for reasons of clarity.

In actual employment, the position measuring device 10 is arranged at a machine tool, for example, and is used for the determination of the position of a movable machine element, for example a tool, wherein a numeric machine control acts as the processing unit 20. Alternatively to this, the position measuring device 10 can also be an angle encoder on an electrical drive mechanism, wherein an appropriate drive control acts as the processing unit 20, etc.

The standard transmission mode in connection with the provided serial data transmission between the position measuring device 10 and the processing unit 20 will be explained in what follows by FIGS. 1 and 2, wherein in this example only the transmission of data on the second data channel 32 from the processing unit 20 in the direction toward the position measuring device 10 will be explained. The data transmission in the opposite direction basically takes place in the identical manner.

Figure 2:
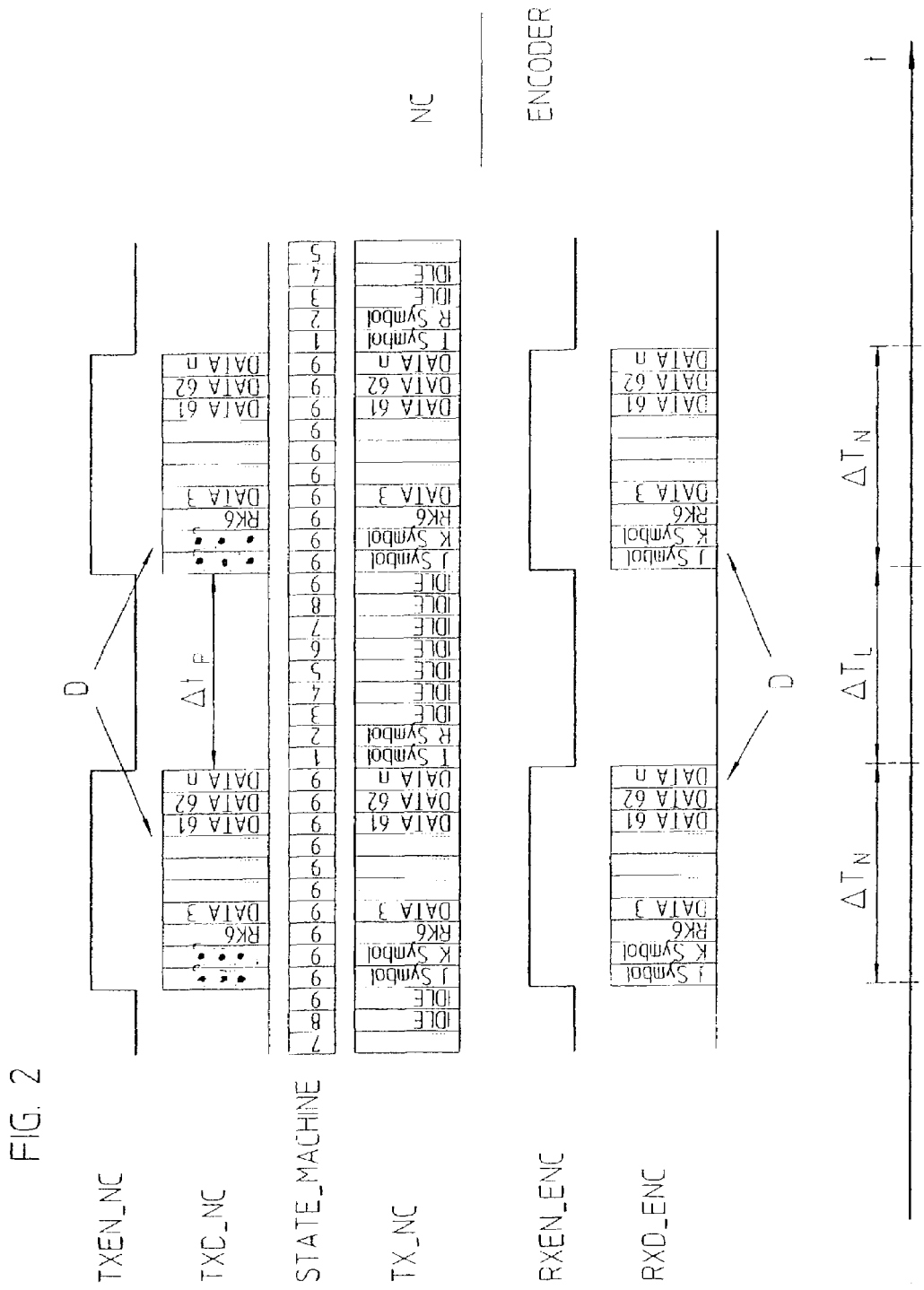
FIG. 2 shows various signal diagrams to explain a standard transmission mode of an interface equipped in accordance with the present invention.

A number of signals on the part of the processing unit (NC) are represented in the upper portion of FIG. 2 in the chronological course of the data transmission, the two lower diagrams show the conditions on the part of the position measuring device (ENCODER).

The data transmission between the respective protocol module 22 and the communications module 23 basically takes place in data packets D, wherein a defined chronological distance $\Delta t_P$ must be maintained between successive data packets D. The data packets D are transmitted on the line TXD_NC from the protocol module 22 to the communications module 23, or the ethernet PHY. For being able to transmit the data packets D, the signal on the line TXEN-NC must have the logical level HIGH, while in the transmission pauses in-between, the logical level LOW exists on this line TXEN_NC. From the communications module 23 a transmission of the respective data takes place on the second data channel 32, or the line TX_NC in the direction toward the position measuring device 10 in a continuous data flow. In this case the continuous data flow includes for one of the data packets D with the various use data, which are transmitted in the form of use data symbols "RK6", "DATA", "DATA 3", . . . , "DATA n" etc. The continuous data flow moreover includes idle data, or idle data symbols "IDLE", which are inserted between the data packets with the use data, which can be seen by the representation of the conditions on the line TX_NC in FIG. 2. In what follows, the times, or transmission phases, in which the transmission of the data packets D takes place, will be identified as use phases $\Delta T_N$. The times, or transmission phases in-between, in which no data are transmitted, are identified as idle phases $\Delta T_L$.

Defined limiting conditions for the form of the data transmitted over the line TX_NC exist because of the employment of conventional ethernet physics. Thus, the transmitted data packets D each includes a defined number of use data symbols, wherein every data packet D starts with two defined data symbols "J symbol", "K symbol", and ends with the data symbols "T symbol", "R symbol". In the same way the number of the transmitted idle data symbols "IDLE" in the idle phases is predetermined. However, depending on actual requirements, it is of course possible for longer idle period phases $\Delta T_L$ to be present, in which then correspondingly more idle data symbols "IDLE" are transmitted, before a data packet D with use data is transmitted again. In order to meet the real time requirements discussed above, and in order to assure as rapid as possible a data exchange, the number $N_{IDLE}$ of the idle data symbols "IDLE" in the idle periods $\Delta T_L$ is reduced as far as possible within the scope of the present invention, in the present example the minimal number $N_{IDLE,min}$ of idle data symbols "IDLE" is selected as $N_{IDLE,min}=7$, i.e. $N_{IDLE} \geq 7$ always applies.

In the lower portion of FIG. 2 the signals on the lines RXEN_ENC and RXD_ENC between the communications module 13 and the protocol module 12 of the position measuring device 10 are represented during the transmission of the data packets D from the processing unit 20. As long as data packets D are received in the course of this during the transmission, the appropriate signal in the line RXEN_ENC between the communications module 13 and the protocol modules 13 is set to the logical level HIGH in the use phases $\Delta T_N$, in the idle phases $\Delta T_L$ it is set to the logical level LOW.

Beside the signals on the various lines so far explained, the information available at the automatic status device 24 (STATE_MACHINE) regarding the status of the running data transmission is furthermore represented. As mentioned, in the exemplary embodiment represented, the automatic status device 24 is assigned to the protocol module 22 of the processing unit 20. Its function in regard to the present invention will be described in greater detail in the course of the subsequent description of FIGS. 3 and 4.

Figure 3:
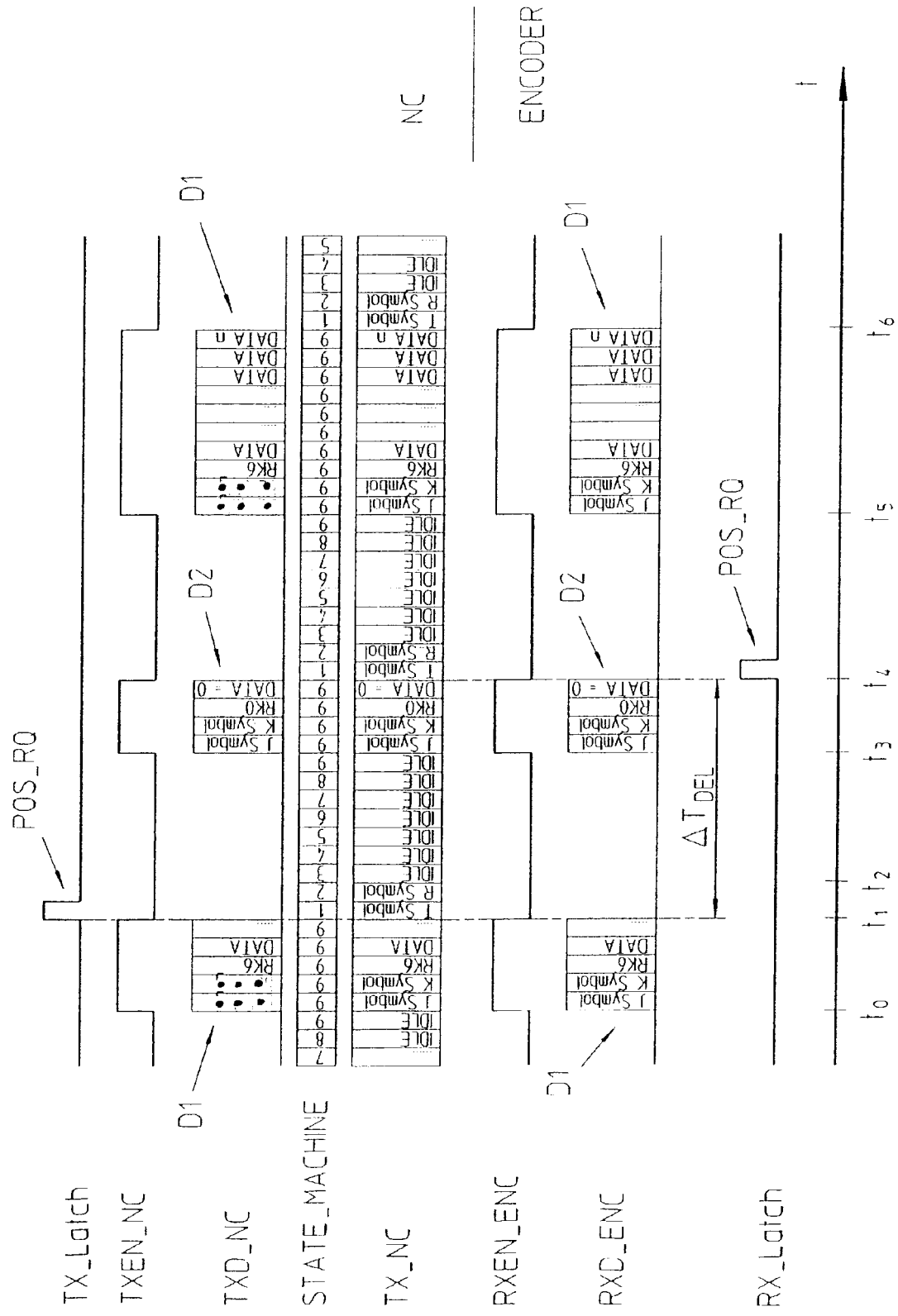
FIG. 3 shows various signal diagrams to explain the case wherein a position request command occurs during a use phase during which a data packet is transmitted to the position measuring device of FIG. 1 in accordance with the present invention.
Figure 4:
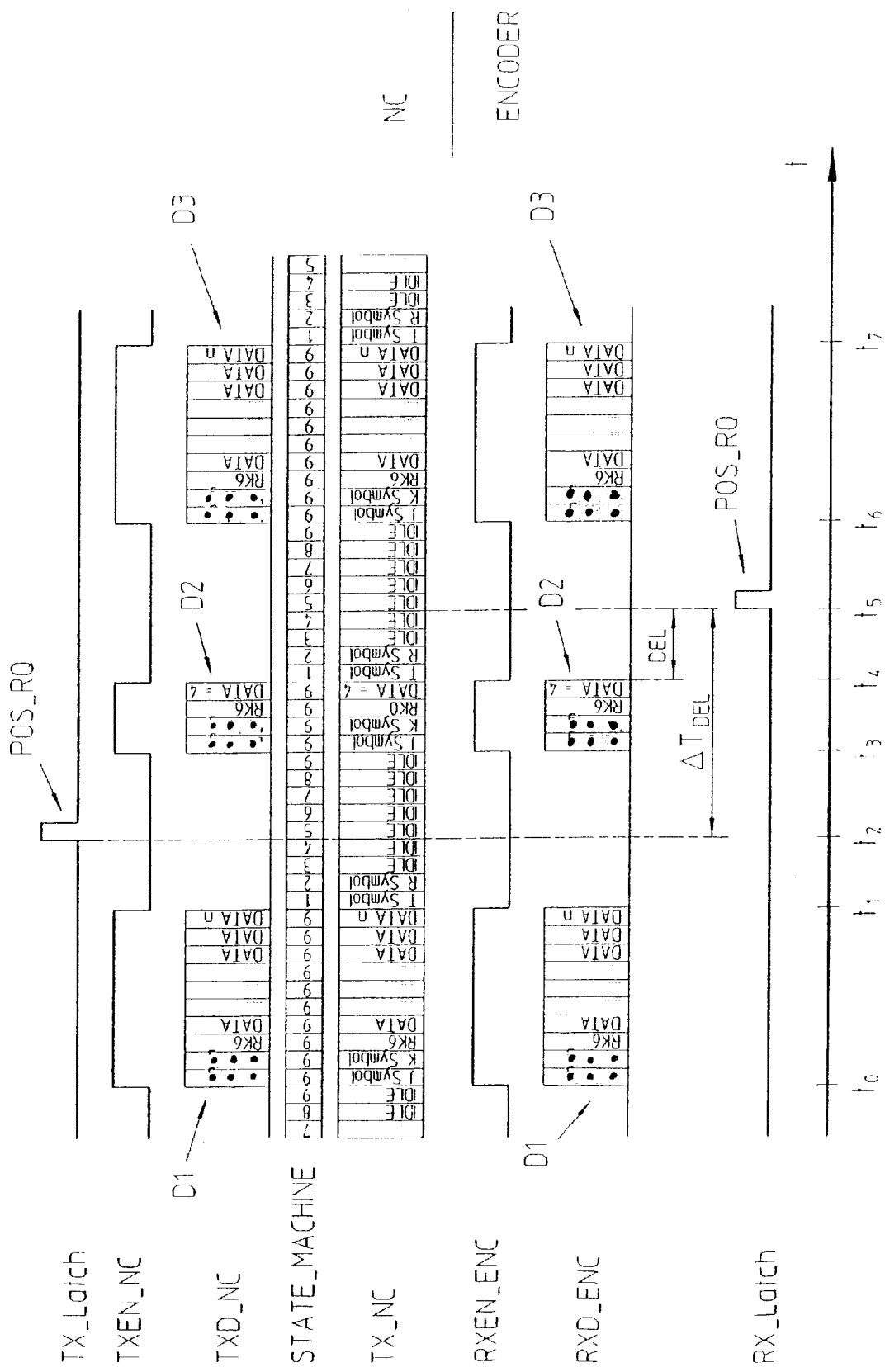
FIG. 4 shows various signal diagrams for explaining the case wherein a position request command occurs during an idle phase during which no use data are transmitted to the position measuring device of FIG. 1 in accordance with the present invention.

As already explained at the outset, it is essential for the real time capability of the present interface that the processing of the position request commands, i.e. the recording of the actual position, is performed by the position measuring device 10 at the determined time for each occurring position request command from the processing unit 20. Since in the case of the present interface protocol such position request commands can basically occur asynchronously, i.e. at any possible time, it is necessary in connection with a data transmission as explained by FIG. 2 to examine various cases in which a position request command can occur. Here, these are the two cases wherein an appropriate position request command occurs a) during a use phase $\Delta T_N$, or b) during an idle phase $\Delta T_L$ during the running data transmission. To assure that the time-determined processing of the position request command, i.e. the recording of the actual position, takes place in both cases in the position measuring device 10, the steps of the present invention, subsequently explained by means of FIGS. 3 and 4, are required. Finally, a special instance in connection with case b) will be described by FIG. 5, wherein a position request command occurs after a prolonged idle phase.

First, the case wherein a position request command POS_RQ occurs during the use phase of the running data transmission from the processing unit to the position measuring device, will be explained in detail by FIG. 3. The use phase was started here at the time $t_0$ with the transmission of a data packet D1. In the center portion of FIG. 3, the conditions during data transmission over the lines are represented again in the same way as in FIG. 2. Moreover, the position request command POS_RQ occurring at the processing unit at the time $t_1$ is shown, which is forwarded over the line TX_Latch to the protocol module 22 and by which the recording and transmission of the actual position data is requested from the position measuring device 10 as soon as possible. At the time $t_1$, the running transmission of the data packet D1 over the line TXD_NC to the communications module 23 is interrupted by the position request command POS_RQ, i.e. the transmission of the data packet D1 over the line TX_NC to the position measuring device is stopped. For the definite termination of the transmission of the data packet D1 during the use phase, the data symbols "T symbol", "R symbol", already mentioned above, are also transmitted over the line TX_NC. In this case the transmission of the data symbols "T symbol", "R symbol" by the communications module 23 is automatically performed as soon as the signal on the line TXEN_NC is changed from HIGH to LOW. As long as this signal has the value LOW, the transmission of idle date symbols "IDLE" takes place. Accordingly, following the transmission of the two data symbols "T symbol", "R symbol", the required transmission of at least a total of $N_{IDLE}=7$ idle data symbols "IDLE" over the line TX_NC takes place at the time $t_2$ in the corresponding idle phase. At the end of the idle phase, the transmission of a data packet D2 is started at the time $t_3$, in which the use data symbols "RKO" and "DATA=0" are transmitted to the position measuring device between the delimiting data symbols "J symbol", "K symbol" and "T symbol", "R symbol". The first use date symbol "RKO" here is the appropriately processed position request command POS_RQ, the second use data symbol "DATA=0" is a second delay information, which will be explained later.

As can be seen from the conditions in regard to the position measuring device represented in the lower portion of the signal diagrams in FIG. 3, following the transmission of the data packet D2 the appropriate position request command POS_RQ is present on a line RX_Latch at the position measuring device at the time $t_4$ and can be processed, i.e. the recording of the actual position can take place.

Following a further idle phase with the transmission of the idle symbols "IDLE", the data packet D1, whose transmission had been previously interrupted at the time $t_1$ by the appearance of the position request command POS_RQ, is again completely transmitted at the time $t_5$ to the position measuring device. The transmission of the data package D1 is terminated at the time $t_6$.

How the position data generated by the position measuring device are finally transmitted to the processing unit after the position request command POS_RQ has been processed in the position measuring device is not represented in FIG. 3.

The period between the time $t_1$, at which the position request command POS_RQ appears at the processing device and the time $t_4$, at which the position request command POS_RQ can be processed by the position measuring device, is now particularly critical for the real time capability of the present interface. The delay time $\Delta T_{DEL}$ between these times now should be as minimal as possible, for one, and furthermore should be identical in every case of an asynchronously appearing position request command POS_RQ, in order to assure a time-determined pickup of the positions by the position measuring device. In the case described, wherein the position request command POS_RQ appeared during the use phase at the processing unit, which could be immediately interrupted, no further measures were required for minimizing the delay time $\Delta T_{DEL}$. Following the interruption of the transmission of the data packet D1, subsequently only the transmission of the minimally ($N_{IDLE,min}$=7) required idle data symbols "IDLE" during the idle phase took place, thereafter the data packet D2 with the use data symbol "RKO" in regard to the position request command could be transmitted. The length of time between the times $t_1$ and $t_4$ therefore constitutes the minimally possible delay time $\Delta T_{DEL}$ when a position request command POS_RQ occurs during a use phase. No possible correction steps are required in this case. The second delay information transmitted in the data packet D2, or the corresponding use data symbol, were therefore given the value "DATA=0".

However, different conditions, and measures required because of them result in the case where a position request command POS_RQ occurs during an idle phase in the running data transmission from the processing unit to the position measuring device. This case will be explained in detail in what follows by FIG. 4. Again, the transmission of the signals on various lines is represented analogously to FIGS. 2 and 3.

Following the transmission of a data packet D1 with various use data, or use data symbols "RK6", "DATA", etc. between the times $t_0$ and $t_1$, a position request command POS_RQ now appears at the processing unit in the course of a subsequent idle phase at the time $t_2$. In this case the position request command POS_RQ in the present example results in the idle phase after the transmission of four idle data symbols "IDLE" has already occurred. This information is available via the already mentioned automatic status device 24, i.e. the information at which time in the idle phase the position request command has occurred. This information will be called the first delay information in what follows. Expressed in other words, the chronological position of the position request command POS_RQ within the idle phase can be derived from the information from the automatic status device 24.

In FIG. 2, as well as in the subsequent drawing figures, the information available via the automatic status device 24 in the course of the data transmission is represented in that portion of the diagram which is identified by "STATE_MACHINE".

Because of the type of data transmission selected on the basis of ethernet physics, the idle phase cannot be immediately terminated. Instead, transmission of the minimal number $N_{IDLE,min}$=7 of idle symbols "IDLE" is required, and with that the correct termination of the minimally possible idle phase. The transmission of the data packet D2 and the correspondingly processed position request command to the position measuring device can finally only be started at the time $t_3$. Again, the required data symbols "J symbol", "K symbol" are transmitted at the start of the data packet D2, which is followed by the use data symbol "RKO", which represents the position request command. Following the transmission of a data frame with the use data symbol "RKO", the transmission of a data frame with the use data symbol "DATA=4" takes place. This use data symbol represents a first delay information which, in the actual example, indicates what the chronological position of the position request command POS_RQ during the idle phase was. At the end of the transmission of the data packet D2 with the appropriate information regarding the position request command POS_RQ and of the first delay information at the time $t_4$, finally the processing of the position request command POS_RQ by the position measuring device, i.e. the recording of the actual position, occurs at the time $t_5$.

As can be seen in FIG. 4, the first delay information with the transmitted use data symbol "DATA=4" is evaluated by the position measuring device in such a way that, following the transmission of the data packet D2 at the time $t_4$, the processing of the position request command POS_RQ is only started after a delay of a determined delay time length DEL. In this case the delay time length DEL corresponds to the transmitted first delay information, or to the corresponding use data symbol "DATA=4", i.e. to that time after the start of the idle phase at the time $t_1$, after which the position request command POS_RQ appeared at the time $t_2$. Therefore, the delay length in the example results as DEL=$t_2$-$t_1$.

The result of processing delayed in this way, in this case between the appearance of the position request command POS_RQ at the time $t_1$ and the processing of the position request command POS_RQ at the time $t_5$, is also a delay time $\Delta T_{DEL}$, which is identical to the delay time $\Delta T_{DEL}$ in the above explained case in accordance with FIG. 3. Therefore the chronologically determined processing of position request commands POS_RQ is assured, independently of the time at which a position request command POS_RQ appears.

The time $t_6$ starts following the end of the subsequent idle phase after the transmission of the next data packet D3, which is terminated at the time $t_7$, etc.

As can be seen from the two cases explained, it is assured by the transmission of a first or second delay information—depending on the phase of the data transmission in which the position request command POS_RQ occurs—that the result is always a defined, i.e. preferably constant, length of time or delay time $\Delta T_{DEL}$ between the appearance of the position request command POS_RQ and its processing in the position measuring device. In this case the delay information is selected to be such that, regardless of the time at which the position request command POS_RQ appears, the constant delay time $\Delta T_{DEL}$ is assured.

In the present case, the delay time $T_{DEL}$ results from the length of the transmission time of the respective data symbols for the predetermined number $N_{IDLE}$ of idle data symbols "IDLE", of the length of the transmission time for transmitting the data symbols "J symbol", "K symbol" for starting, and of the data symbols "T symbol", "R symbol" for ending data packets D, as well as the length of transmission times for the use data symbols regarding the position request command POS_RQ, and the first or second delay information, or the corresponding use data symbols.

As explained in the case of FIG. 3, a minimum delay time $\Delta T_{DEL}$ results in the example, which corresponds to the length of the transmission of a total of 13 data symbols. The 13 data symbols result from the seven data symbols provided as idle data symbols "IDLE" for the minimal number of $N_{IDLE,min}$=7, four data symbols "J symbol" to "R symbol" for starting and ending the data packets, and the two use data symbols "RKO", as well as "DATA=0", or "DATA=4". The case, wherein in accordance with FIG. 4 the position request command POS_RQ appears during an idle phase, is then also correspondingly set to this minimum delay time $\Delta T_{DEL}$.

Figure 5:
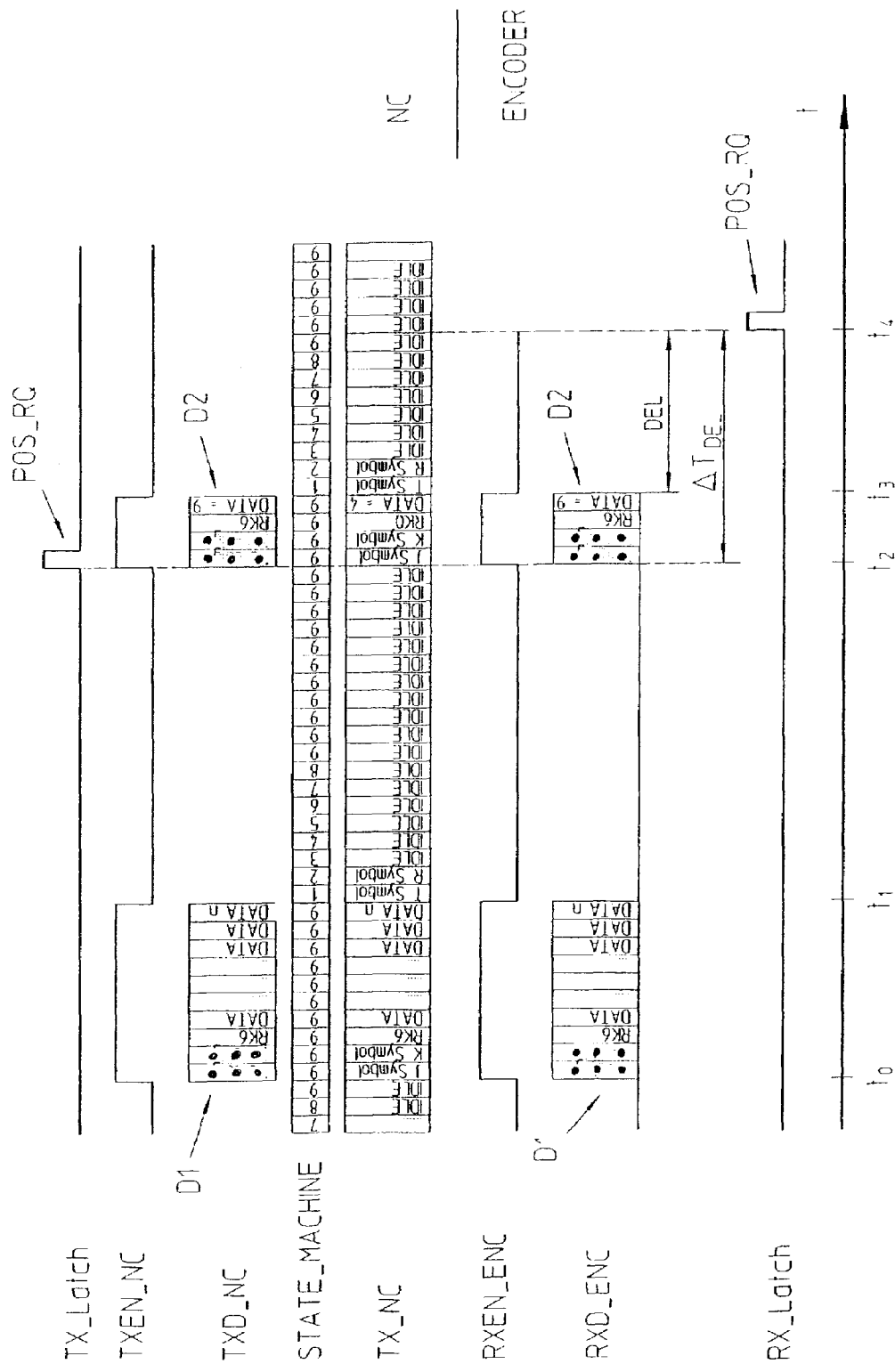
FIG. 5 shows various signal diagrams for explaining the case wherein a position request command occurs during an extended idle phase during which no use data are transmitted to the position measuring device of FIG. 1 in accordance with the present invention.

In conclusion, a special case of the previously explained case will be described by FIG. 5, wherein the position request command POS_RQ appears at the processing unit after an extended idle phase. In FIG. 5 the signal progression is again represented analogously to the cases discussed so far.

After the transmission of the first data packet D1 between the times $t_1$ and $t_2$, an extended idle phase follows in the present case. The idle phase lasts clearly longer than the preset minimal length of $N_{IDLE,min}=7$ transmitted idle data symbols "IDLE". Now, the position request command POS_RQ results only after the transmission of a total of seventeen idle data symbols "IDLE" over the line TX_NC at the time $t_2$ at the processing unit over the line TX_Latch. Since at this time the idle phase has already lasted clearly longer than the preset minimal length, the idle phase can be immediately interrupted and the transmission of the data packet D2 can be started immediately. The data packet D2 again starts with the data symbols "J symbol", "K symbol", which is followed by the transmission of the use data symbol "RKO" with the appropriately processed position request command. Furthermore, at the end of this data packet D2 the transmission of a first delay information to the position measuring device takes place in the form of the use data symbol "DATA=9". The first delay information "DATA=9" is again evaluated by the position measuring device in such a way that, following the end of the transmission of the data packet D2 at the time $t_3$, the processing of the position request command POS_RQ only takes place after a defined delay DEL, i.e. at the time $t_4$. The first delay information "DATA=9", or the delay time DEL, again were selected in such a way that a length of the delay time $\Delta T_{DEL}$ results between the time $t_2$ and the time $t_3$ which is identical to the two prior cases. The time-determined processing of the position request command POS_RQ, or the recording of the actual position data, is therefore also assured in this case.

In the course of the description of the present invention it has not yet been mentioned that the signals transmitted by the position measuring device to the processing unit, and vice versa, of course have a defined running time on the various data channels, i.e. delays based on the running time result in the course of the data transmission. Such signal delays become all the more noticeable, the longer the corresponding cables are. In order to meet the real time requirements for a rapid digital interface discussed at the outset, it is advantageous to determine the signal delays, or signal running times, required for a defined transmission distance and to take them into consideration in the signal processing in the form of suitable compensating steps. However, it is a prerequisite for the compensation of such signal running times that they are determined first in connection with a defined transmission distance. This can take place, for example, by means of a suitable running time measurement prior to startup. The steps which were explained above in connection with the processing of a position request command in as time-determined a manner as possible, can be employed in a particularly advantageous manner for such a running time measurement.

Thus, for a highly precise running time measurement it is possible to use the position request command POS_RQ which is transmitted—as explained above—from the processing unit to the position measuring device, and then returned by the latter to the processing unit. The time $\Delta t = t_R - t_S$ which has passed from the sending of the position request command POS_RQ at the time $t_S$ until the receipt of the position request command POS_RQ at the time $t_R$ can be used for determining the signal running time $t_L$ on this transmission path.

To do this, it is necessary to detect, for example by means of a counter at the processing unit, the respective time $\Delta t$. If moreover the signal processing time $t_{cal}$ for processing such a method in the position measuring device and the processing unit is known, the signal running time $t_L$ can be determined in this way. Since because of the above explained steps a time-determined transmission of the position request command POS_RQ used for the running time measurement is assured, it is possible by the present invention to determine the signal running time $t_L$ of such an interface architecture with a high degree of accuracy.

To perform an appropriate running time measurement on the basis of the present invention it is only necessary to provide an automatic status device at the position measuring device as a supplement to the example represented in FIG. 1, which is assigned there to the protocol module and in principle performs the same functions as the automatic status device at the processing unit.

Obviously still further embodiment variations, besides the explained example, exist within the scope of the present invention.

I claim:

1. A method for serial data transmission between a position measuring device and a processing unit, comprising:

transmitting data packets between a position measuring device and a processing unit during a set of use phases, wherein a set of idle phases during which no data are transmitted are interspersed so that an idle phase is located between successive ones of said set of use phases;

wherein in case of an appearance of a position request command during one of said set of idle phases, said position request command is transmitted, together with a first delay information, to said position measuring device at an end of said one of said set of idle phases; and evaluating said first delay information by said position measuring device to the effect that a constant delay time always results between an appearance of said position request command at said processing unit and processing of said position request command at a processing unit of said position measuring device.

2. The method in accordance with claim 1, wherein in case of an appearance of said position request command during one of said set of use phases in which data are transmitted from said processing unit to said position measuring device, said transmitting of said data packets is terminated, and said position request command is transmitted to said position measuring device at an end of an idle phase that is immediately subsequent to said one of said set of use phases.

3. The method in accordance with claim 2, further comprising:

transmitting a second delay information to said position measuring device together with said position request command; and evaluating said second delay information by said position measuring device in such a way that the result is always a constant delay time between an appearance of said position request command at said processing unit and said processing of said position request command in said position measuring device.

4. The method in accordance with claim 3, wherein said second delay information indicates a minimal delay time.

5. The method in accordance with claim 1, further comprising:

selecting said delay information in such a way that, regardless of a time of appearance of said position request command at said processing unit, always a constant delay time results between an appearance of said position request command at said processing unit and said processing of said position request command in said position measuring device.

6. The method in accordance with claim 1, wherein said one of said set of idle phases during which said position request command appears is only terminated after a preset minimum length, and idle data symbols are constantly being transmitted in the course of said one of said set of idle phases.

7. The method in accordance with claim 1, further comprising:
   transmitting position data from said position measuring device to said processing unit following said processing of said position request command in said position measuring device.

8. The method in accordance with claim 2, wherein complete transmission of said data packets, whose transmission was interrupted after an appearance of said position request command, is repeated after transmission of said position request command to said position measuring device has taken place.

9. The method in accordance with claim 1, wherein said transmitting between said position measuring device and said processing unit takes place in a fully duplex operation over two data channels.

10. The method in accordance with claim 1, further comprising measuring a running time between said processing unit and said position measuring device.

11. The method in accordance with claim 10, wherein said measuring said running time comprises:
   sending said position request command from said processing unit to said position measuring device;
   returning said position request command from said position measuring device to said processing unit,
   determining a time, which has passed between said sending until said returning of said position request command;
   utilizing said determined time for determining said running time.

* * * * *